(12) United States Patent
Fujimura et al.

(10) Patent No.: US 8,796,171 B2
(45) Date of Patent: Aug. 5, 2014

(54) DENITRATION CATALYST COMPOSITION AND METHOD OF DENITRATION USING SAME

(75) Inventors: Takehiro Fujimura, Numazu (JP); Yasuharu Kanno, Numazu (JP)

(73) Assignee: N.E. Chemcat Corporation, Tokyo (JP)

( * ) Notice: Subject to any disclaimer, the term of this patent is extended or adjusted under 35 U.S.C. 154(b) by 0 days.

(21) Appl. No.: 13/885,256

(22) PCT Filed: Oct. 13, 2011

(86) PCT No.: PCT/JP2011/073480
§ 371 (c)(1),
(2), (4) Date: May 14, 2013

(87) PCT Pub. No.: WO2012/096039
PCT Pub. Date: Jul. 19, 2012

(65) Prior Publication Data
US 2013/0236381 A1   Sep. 12, 2013

(30) Foreign Application Priority Data

Jan. 13, 2011  (JP) .................................. 2011-004528

(51) Int. Cl.
| | | |
|---|---|---|
| *B01J 21/00* | (2006.01) |
| *B01J 23/00* | (2006.01) |
| *B01J 23/02* | (2006.01) |
| *B01J 23/10* | (2006.01) |
| *B01J 23/40* | (2006.01) |
| *B01J 23/42* | (2006.01) |
| *B01J 23/63* | (2006.01) |
| *B01D 53/94* | (2006.01) |
| *B01J 35/02* | (2006.01) |
| *B01D 53/56* | (2006.01) |
| *B01J 35/10* | (2006.01) |
| *B01J 35/00* | (2006.01) |
| *F01N 3/28* | (2006.01) |
| *F01N 3/08* | (2006.01) |

(52) U.S. Cl.
CPC .......... *B01J 23/63* (2013.01); *B01D 2255/2063* (2013.01); *B01D 2255/2068* (2013.01); *B01D 2255/90* (2013.01); *B01D 53/9413* (2013.01); *B01D 2255/2066* (2013.01); *F01N 2570/14* (2013.01); *B01D 2255/9202* (2013.01); *B01J 35/023* (2013.01); *B01D 2255/2065* (2013.01); *B01D 2255/407* (2013.01); *B01D 53/565* (2013.01); *B01J 23/002* (2013.01); *B01D 2255/1025* (2013.01); *B01J 35/1061* (2013.01); *B01D 2258/0283* (2013.01); *B01D 2255/20738* (2013.01); *B01D 2258/012* (2013.01); *B01D 2255/2061* (2013.01); *B01J 23/10* (2013.01); *B01J 35/002* (2013.01); *F01N 3/2803* (2013.01); *B01D 2255/20715* (2013.01); *F01N 3/0864* (2013.01); *B01J 2523/00* (2013.01)
USPC ........... 502/326; 502/302; 502/303; 502/304; 502/349; 502/439

(58) Field of Classification Search
CPC .......... B01J 21/066; B01J 23/10; B01J 23/40; B01J 23/464; B01J 23/56; B01J 23/63; B01J 23/894
USPC ......................... 502/302–304, 326, 349, 439
See application file for complete search history.

(56) References Cited

U.S. PATENT DOCUMENTS

| | | | | |
|---|---|---|---|---|
| 5,945,369 | A * | 8/1999 | Kimura et al. ............... | 502/304 |
| 7,214,643 | B2 * | 5/2007 | Yamamoto et al. ........... | 502/300 |
| 7,691,778 | B2 * | 4/2010 | Honda et al. .................. | 502/326 |
| 8,043,992 | B2 * | 10/2011 | Hatanaka et al. ............. | 502/327 |
| 8,580,705 | B2 * | 11/2013 | Aoki et al. .................... | 502/304 |
| 2006/0189480 | A1 * | 8/2006 | Takeshima .................... | 502/304 |
| 2007/0117715 | A1 * | 5/2007 | Miyoshi et al. ............... | 502/304 |
| 2009/0318286 | A1 * | 12/2009 | Nagata et al. ................. | 502/339 |

FOREIGN PATENT DOCUMENTS

| | | |
|---|---|---|
| JP | 08-229400 A | 9/1996 |
| JP | 2003-024783 A | 1/2003 |
| JP | 2006-341201 A | 12/2006 |
| JP | 2010-260046 A | 11/2010 |
| WO | 2007/119658 A1 | 10/2007 |

OTHER PUBLICATIONS

International Search Report for PCT/JP2011/073480, mailing date of Nov. 15, 2011.

D. Martin et al., "Mobility of Surface Species on Oxides. 1. Isotopic Exchange of $18O^2$ with $16O$ of $SiO^2$, $Al^2O^3$, $ZrO^2$, MgO, $CeO^2$, and $CeO^2$-$Al^2)^3$. Activation by Noble Metals. Correlation with Oxide Basicity", J. Phys. Chem. (1996), vol. 100, pp. 9429-9438.

Japanese Written Opinion of PCT/JP2011/073480, mailing date of Nov. 15, 2011.

\* cited by examiner

*Primary Examiner* — Cam N. Nguyen (74) *Attorney, Agent, or Firm* — Westerman, Hattori, Daniels & Adrian, LLP

(57) ABSTRACT

A denitration catalyst composition to efficiently and reductively remove nitrogen oxides from exhaust gas of a boiler or an internal combustion engine operated in lean-combustion, such as a gasoline engine, a diesel engine, by carbon monoxide and hydrocarbons; and a denitration method using the catalyst composition. In the denitration catalyst composition, a precious metal element having Rh as an essential component is supported on a zirconium oxide-based carrier formed by condensing or mixing primary particles having a zirconium oxide as a main component, and further a cerium-containing oxide (B) is present at the surface of the zirconium oxide-based carrier and at the gap of the secondary particles; and a denitration method characterized in that exhaust gas containing NO, CO and $O_2$ is contacted with the denitration catalyst composition, under oxidative atmosphere having an air/fuel ratio of 14.7 or higher, at a temperature of 400 to 800° C.

11 Claims, 4 Drawing Sheets

Conventional technology the present invention (2)

the present invention (1)

the present invention (1) magnified

DENITRATION CATALYST COMPOSITION AND METHOD OF DENITRATION USING SAME

TECHNICAL FIELD

The present invention relates to a denitration catalyst composition and a denitration method using the same, and more specifically the present invention relates to a denitration catalyst composition to efficiently and reductively remove nitrogen oxides from exhaust gas of a boiler or an internal combustion engine operated in lean-combustion, such as a gasoline engine, a diesel engine; and a denitration method using the same.

BACKGROUND ART

The toxic substances included in exhaust gas of an automobile using gasoline as fuel, are mainly hydrocarbons (HC), carbon monoxide (CO) and nitrogen oxides ($NO_x$), and by introducing them into a catalyst apparatus using platinum, palladium and rhodium, hydrocarbons, carbon monoxide and nitrogen oxides are oxidized or reduced to water and carbon dioxide, to carbon dioxide, and to nitrogen, respectively, and removed simultaneously. To oxidize or reduce these toxic substances efficiently, it is necessary for gasoline and air to combust completely and to be theoretical air/fuel ratio without remaining oxygen, which requires to measure always oxygen concentration in exhaust gas using an oxygen sensor or the like, so as to control fuel injection amount or the like, based on this information.

Nitrogen oxides are generated only in extremely trace amount in usual combustion, however, in a combustion chamber becoming a high temperature and high pressure state, nitrogen is easily oxidized and generation amount increases. In recent years in which compression ratio has become high in average to enhance combustion efficiency, discharged amount thereof has attained to a non-negligible level.

Among the whole discharged gas, generation amount by discharged gas from an automobile occupies 30%. Trace amount of nitrogen oxides are useful for growth of plants, however, high concentration thereof causes air pollution, photochemical smog, and acid rain, therefore, in an automobile, an engine control is performed so as to decrease compression ratio or combustion temperature to suppress generation thereof.

In addition, in a flow passage of exhaust gas of an automobile, a catalyst is arranged in response to toxic substances to be purified, so as to purify the toxic components such as nitrogen oxides in exhaust gas at one stage or in step-wise. As such a catalyst, an integral-structure-type catalyst where a catalyst composition is coated on a honeycomb-type structure has been used. The honeycomb-type structure means the one in which many fine parallel gas flow paths extend in a barrel of a structure made of a metal such as stainless steel, or a heat resistant material such as ceramic, and the catalyst composition coated on the part forming this gas flow path. Among such a honeycomb structure, the one in which both end faces of the gas flow path is open is called a flow-through-type, and the one in which either of the end faces of the gas flow path is sealed is called a wall-flow-type. In the wall-flow-type, the wall face of the gas flow path serves as a filter to filter off a particulate component such as soot from exhaust gas.

As one technology for purifying nitrogen oxides discharged from a diesel engine, there has been known denitration technology using fuel light oil as a hydrocarbon for reduction, for example, use of a catalyst in which a transition metal and a precious metal are supported on a mordenite-type zeolite carrier has been proposed (PATENT LITERATURE 1). By using this, it has become possible to efficiently reduce the nitrogen oxides under oxygen excess atmosphere in exhaust gas.

On the other hand, in purification by an automotive catalyst (three way catalyst) for a gasoline vehicle, in addition to an NO reduction reaction via a reaction under rich atmosphere represented by a steam reforming reaction or a water gas shift reaction, there is included a CO—NO reaction, which is one of important elementary reactions to reduce NO even in a lean region having relatively high oxygen concentration. The CO—NO reaction is the one to reduce NO by utilizing CO present in a large quantity in exhaust gas from an automobile, and the reaction proceeds as in the following reaction equation (1).

$$CO+NO \rightarrow CO_2+N_2 \quad (1)$$

$$2CO+O_2 \rightarrow 2CO_2 \quad (2)$$

It should be noted that in stoichiometric atmosphere, it has also been known that when temperature exceeds 600° C., the reaction (2) becomes predominant, while at 600° C. or lower, the reactions (1) and (2) proceed competitively, and selectivity thereof depends on oxygen concentration around a precious metal element (NON PATENT LITERATURE 1). However, such phenomenon has been confirmed that in the CO—NO reaction under coexistence of oxygen, because the CO—$O_2$ reaction proceeds competitively in this way, the CO—$O_2$ reaction little proceeds using a known catalyst.

In exhaust gas regulations of an automobile, a regulation standard is set assuming running on a practical road, and exhaust gas concentration is not the one measured under engine operating condition in a steady state. In such the regulation standard on the assumption of running on a practical road, not only high speed running with a stable combustion state but also running under condition of small accelerator opening and low engine speed in an urban area are assumed. Generally, in order to enhance catalytic activity, high temperature condition to some extend is desirable, however, because CO or HC, which is a reducing agent, reacts with oxygen selectively in a region where oxygen coexists, in particular, as for the NO reduction reaction in which oxygen is present in excess amount than stoichiometric ratio, there was sometimes the case where satisfactory purification effect of exhaust gas was not obtained.

Further, because temperature of exhaust gas exceeds 1000° C. in many cases, in particular, in a gasoline vehicle, an automotive catalyst essentially requires to have heat resistance at high temperature, in view of practical use. To solve this problem, such a catalyst for exhaust gas purification has been proposed that is provided with a precious metal particle and a substrate supporting the relevant precious metal particle, and formed with a compound between the precious metal particle and the substrate at least at a part of a contact region of the precious metal particle and the substrate (PATENT LITERATURE 2). According to PATENT LITERATURE 2, because a compound between the precious metal particle and the substrate is formed at least at a part of a contact region of the precious metal particle and the substrate, and movement of the precious metal particle is suppressed (anchor effect), sintering of the precious metal particle is suppressed and decrease in purification performance of the exhaust gas purification catalyst can be suppressed. However, although PATENT LITERATURE 2 intends to suppress sintering of the precious metal particle at a high temperature exceeding 500° C., it does not take into consideration of the above reactions (1) and (2) proceeding competitively at 500° C. or lower, about the CO—NO reaction under coexistence of oxygen, therefore purification performance of the exhaust gas purification catalyst was not sufficient.

Under such circumstances, there has been desired earnestly a denitration catalyst composition which is capable of enhancing purification ability of exhaust gas and stably purifying nitrogen oxides in exhaust gas, without increasing activated metal amount in a catalyst composition.

CITATION LIST

Patent Literature

Patent Literature 1: JP-A-08-229400 (paragraph 0015)
Patent Literature 2: JP-A-2006-341201

Non Patent Literature

Non Patent Literature 1: J. Phys. Chem. 1996, 100, 9429-9438 (FIG. 17)

SUMMARY OF INVENTION

Technical Problem

It is an object of the present invention, in consideration of the above problem, to provide a denitration catalyst composition to efficiently and reductively remove nitrogen oxides from exhaust gas of a boiler or an internal combustion engine operated in lean-combustion, such as a gasoline engine, a diesel engine; and a denitration method using the same.

Solution to Problem

The present inventors have intensively studied a way to solve such problems and discovered that, for a conventional catalyst, where the CO—NO reaction little proceeds because the CO—$O_2$ reaction proceeds competitively in the CO—$O_2$ reaction under coexistence of oxygen, as a result of groping Rh/$ZrO_2$-type catalyst powder which decreases oxygen concentration around a catalyst activated point, by making a $CeO_2$ material presented therein in a special form, selectivity of the NO—CO reaction enhances under coexistence of oxygen, and have thus completed the present invention.

That is, according to a first aspect of the present invention, there is provided a denitration catalyst composition, characterized in that a precious metal element (C) having rhodium (Rh) as an essential component is supported on a zirconium oxide-based carrier (A) formed by condensing or mixing primary particles having a zirconium oxide as a main component, and further a cerium-containing oxide (B) is present at the surface of the zirconium oxide-based carrier (A) and at the gap of the secondary particles.

In addition, according to a second aspect of the present invention, there is provided the denitration catalyst composition, characterized in that, in the first aspect, the zirconium oxide-based carrier (A) contains one or more kinds of a rare earth element and a transition metal element selected from La, Nd, Pr, Fe and Y, in an amount of 1 to 30% by weight, as an oxide.

In addition, according to a third aspect of the present invention, there is provided the denitration catalyst composition, characterized in that, in the first aspect, a pore of the zirconium oxide-based carrier (A) is composed of a pore formed by the primary particle of 5 to 100 nm, and a pore formed by the secondary particle of 0.2 to 10 μm.

In addition, according to a fourth aspect of the present invention, there is provided the denitration catalyst composition, characterized in that, in the first aspect, particle diameter of the cerium-containing oxide (B) is 0.01 to 20 μm.

In addition, according to a fifth aspect of the present invention, there is provided the denitration catalyst composition, characterized in that, in the first aspect, crystallite diameter of the cerium-containing oxide (B) is 8 to 50 μm.

In addition, according to a sixth aspect of the present invention, there is provided the denitration catalyst composition, characterized in that, in the first aspect, the cerium-containing oxide (B) is a single phase of a cerium oxide or contains one or more kinds of a rare earth element and a transition metal element selected from La, Nd, Pr, Fe and Y, in an amount of 0 to 50% by weight, as an oxide.

In addition, according to a seventh aspect of the present invention, there is provided the denitration catalyst composition, characterized in that, in the first aspect, solid solubility of the cerium-containing oxide (B) into the zirconium oxide-based carrier (A) is 50% or lower.

In addition, according to an eighth aspect of the present invention, there is provided the denitration catalyst composition, characterized in that, in the first aspect, content of the cerium-containing oxide (B) is 1 to 50% by weight, relative to the zirconium oxide-based carrier (A).

Further, according to a ninth aspect of the present invention, there is provided the denitration catalyst composition, characterized in that, in the first aspect, the precious metal element (C) has a particle diameter of 1 to 5 nm.

In addition, according to a tenth aspect of the present invention, there is provided the denitration catalyst composition, characterized in that, in the first aspect, content of the precious metal element (C) is 0.01 to 10% by weight, relative to the zirconium oxide-based carrier (A).

On the other hand, according to an eleventh aspect of the present invention, there is provided a denitration method characterized in that exhaust gas containing NO (nitrogen oxides), CO (carbon monoxide) and $O_2$ (oxygen) is contacted with the denitration catalyst composition in any one of the first to the tenth aspects, under oxidative atmosphere having an air/fuel ratio (A/F) of 14.7 or higher, at a temperature range of 400 to 800° C.

Advantageous Effects of Invention

The denitration catalyst composition of the present invention is superior in reduction activity of nitrogen oxides, and exerts high purification performance for nitrogen oxides discharged from various combustion apparatuses. In particular, since it enhances selectivity of the NO—CO reaction under coexistence of oxygen, and dramatically enhances purification performance of nitrogen oxides in a temperature range of 400 to 800° C., even when oxygen concentration in exhaust gas varies, it exerts superior performance in purification of nitrogen oxides discharged from a gasoline engine and a diesel engine.

Further, the denitration catalyst composition of the present invention can be produced in low cost, because of small use amount of an expensive activated metal, therefore, it can provide and supply an exhaust gas purification apparatus stably.

DESCRIPTION OF EMBODIMENTS

Explanation will be given below in detail on the denitration catalyst composition of the present invention, and the denitration method using the same. It should be noted that the description will be given mainly on embodiments in a gasoline vehicle and a diesel automobile, however, the present invention should not be limited to automotive applications, and is applicable widely to denitration technology of nitrogen oxides in exhaust gas.

1. The Denitration Catalyst Composition

The denitration catalyst composition of the present invention is characterized in that a precious metal element (C) having rhodium (Rh) as an essential component is supported on a zirconium oxide-based carrier (A) formed by condensing or mixing the primary particles having a zirconium oxide as a main component, and still more a cerium-containing oxide (B) is present at the surface of the zirconium oxide-based carrier (A) and at the gap of the secondary particles.

(1) The Zirconium Oxide-Based Carrier (A)

The denitration catalyst composition of the present invention is composed of catalytically active components, promoter components and a carrier supporting them, and as the carrier, the zirconium oxide-based carrier (A) is used.

Raw material powder of the zirconium oxide-based carrier is a known material, and is a crushed one of oxide particles obtained, for example, by calcining one or more kinds of inorganic or organic zirconium compounds, in air at 450 to 600° C.

The zirconium oxide-based carrier (A) may be a single component oxide of zirconium, however, it may be a composite oxide with a rare earth composite oxide or the like. It is preferable that it contains one or more kinds of a rare earth element and a transition metal element, selected from La, Nd, Pr, Fe and Y, in an amount of 1 to 30% by weight, as an oxide.

That is, there is included, for example, a gadolinium oxide/zirconia composite oxide, a neodymium oxide/zirconia composite oxide, a zirconia/praseodymium oxide composite oxide, a zirconia/lanthanum oxide composite oxide, a neodymium oxide/zirconia composite oxide, a zirconia/lanthanum oxide/samarium oxide composite oxide, a zirconia/terbium oxide composite oxide, or the like. In this case, standard weight ratio of zirconia and other oxides in a solid solution is in a range of 95 to 70:5 to 30, and preferably 90 to 75:10 to 25.

Particle diameter of the zirconium oxide-based carrier (A) is not especially limited, however, the average particle diameter is, for example, preferably 1 to 50 µm.

In addition, it is preferable that a pore of the zirconium oxide-based carrier (A) is composed of a pore formed by the primary particle of 5 to 100 nm, and a pore formed by the secondary particle of 0.2 to 10 µm. Such a pore can support the following precious metal element (C), and make the cerium-containing oxide (B) presented at the surface and the gap of the secondary particles in a specific state.

(2) The Precious Metal Element (C)

In the present invention, as the precious metal element, rhodium is contained as an essential component. Rhodium can significantly enhance denitration performance by combined use with the cerium-containing oxide (B) as a promoter. As the precious metal element, platinum, palladium, gold, silver or the like can be included besides rhodium. Use of platinum or palladium enhances more purification performance of hydrocarbons contained in exhaust gas, and suppresses also more catalyst poisoning. For example, combined use of rhodium and palladium can still more enhance denitration performance of rhodium.

Content of the precious metal element (C) is 0.01 to 10% by weight, preferably 0.1 to 5% by weight and more preferably 0.5 to 3.0% by weight, relative to the zirconium oxide-based carrier (A). The content within this range can exert superior denitration performance.

It should be noted that, in addition to the precious metal element, a transition metal, a rare earth metal or the like may be contained to the extent not to impair objects of the present invention. Specifically, there is included a transition metal such as nickel, cobalt, zirconium, cupper, iron; and a rare earth metal such as lanthanum, praseodymium, neodymium.

(3) The Cerium-Containing Oxide (B)

A catalyst where rhodium is supported on the above zirconia carrier (A), that is, $Rh/ZrO_2$, can enhance purification efficiency of $NO_x$ by the steam reforming reaction. However, the $CO—O_2$ reaction proceeds predominantly under coexistence of oxygen, which decreases selectivity of the CO—NO reaction, therefore, it is not sufficient as a denitration catalyst as it is, and catalyst powder to decrease oxygen from $Rh/ZrO_2$ is required.

Accordingly, in the denitration catalyst composition of the present invention, other than the precious metal element (C) having rhodium (Rh) supported on the zirconium oxide-based carrier (A), as an essential component, the cerium-containing oxide (B) is contained.

It has conventionally been well known that a $CeO_2$ material can store and discharge oxygen as in the following equation (3) in response to oxidation or reduction atmosphere, and has function as an OSC for storing and discharging oxygen in a bulk. By performing an oxidation reaction of CO, HC and soluble organic components with utilizing this reaction, these toxic components can be purified.

$$2CeO_2 \leftrightarrow Ce_2O_3 + O_2 \qquad (3)$$

However, function of $CeO_2$ as a denitration catalyst in the CO—NO reaction under coexistence of oxygen, not the OSC function, has little been known. In the present invention, by clarification of function as the denitration catalyst, such characteristics is utilized that, in a $CeO_2$ state where Ce is saturated with oxygen, substitution rate of oxygen in air and oxygen at the oxide surface is far faster as compared with a $ZrO_2$ material or an $Al_2O_3$ material.

The present invention focuses on surface oxygen exchangeability of various oxides, and in order to control oxygen concentration, adopts such a structure that fine particles of $CeO_2$ are located around the secondary particles of $Rh/ZrO_2$. In this way, oxygen concentration decreases around the catalyst activated point, which suppresses the $CO—O_2$ reaction and promotes the CO—NO reaction.

Figure 1:
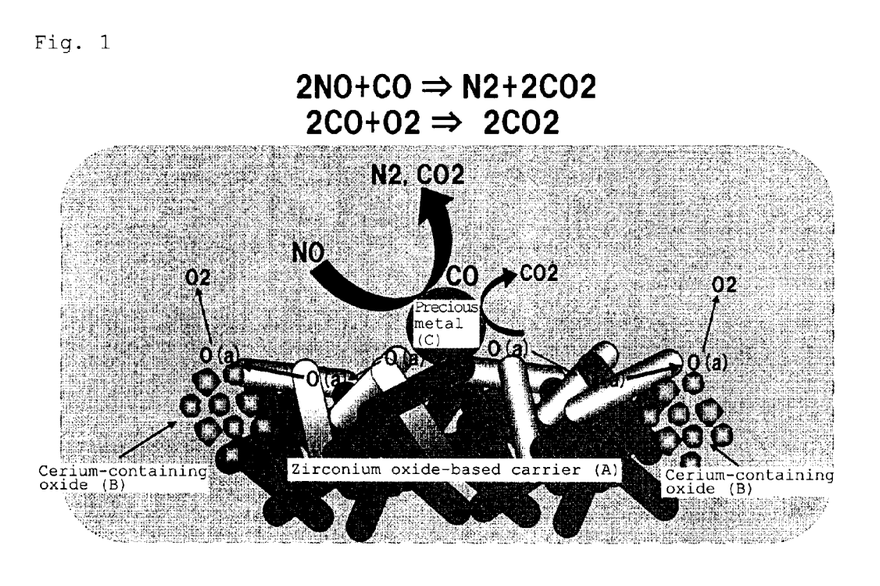
FIG. 1 is a schematic explanation drawing showing a structure of the denitration catalyst composition of the present invention, and reaction mechanism of the NO—CO reaction under atmosphere of carbon monoxide and oxygen.

FIG. 1 shows a structure of the denitration catalyst composition of the present invention, and reaction mechanism of the denitration reaction under atmosphere of carbon monoxide and oxygen. In the case where $CeO_2$ is not supported on a $ZrO_2$ carrier, NO reacts with CO to generate $CO_2$ and $N_2$, at the Rh surface in the CO—NO reaction, and at the same time, oxygen dissociated on Rh reacts with CO to generate $CO_2$. However, in the present catalyst, it is considered that, since $CeO_2$ is supported together with Rh on the $ZrO_2$ carrier, $O_2$ discharge flow is formed from the $ZrO_2$ surface to $CeO_2$ and further from $CeO_2$ to atmosphere, which enables to decrease oxygen concentration on the surface of $Rh/ZrO_2$.

As the cerium-containing oxide, a powder and particulate material such as a cerium-transition metal composite oxide, a cerium-rare earth metal composite oxide may be used, in addition to the cerium oxide (ceria). That is, the cerium-containing oxide (B) may be a single phase of a cerium oxide or may contain one or more kinds of a rare earth element and a transition metal element selected from La, Nd, Pr, Fe and Y, in an amount of 1 to 50% by weight, as an oxide.

It is preferable that the cerium-containing oxide (B) contains one or more kinds of a rare earth element and a transition metal element selected from La, Nd, Pr, Fe and Y, in an amount of 1 to 50% by weight, as an oxide, and more preferably 3 to 45% by weight.

In the composite oxide, the cerium oxide (ceria) and zirconium oxide (zirconia) or the like may be considered, as not a simply physically mixed one but as one oxide obtained by chemical bonding each other with sandwiching an oxygen atom within a lattice.

In the present invention, it is necessary that particles of the cerium-containing oxide (B) exist not only simply at the surface of a carrier but also exist at the gap where particles are formed by the secondary particles of the carrier, and inside the pores.

Figure 2:
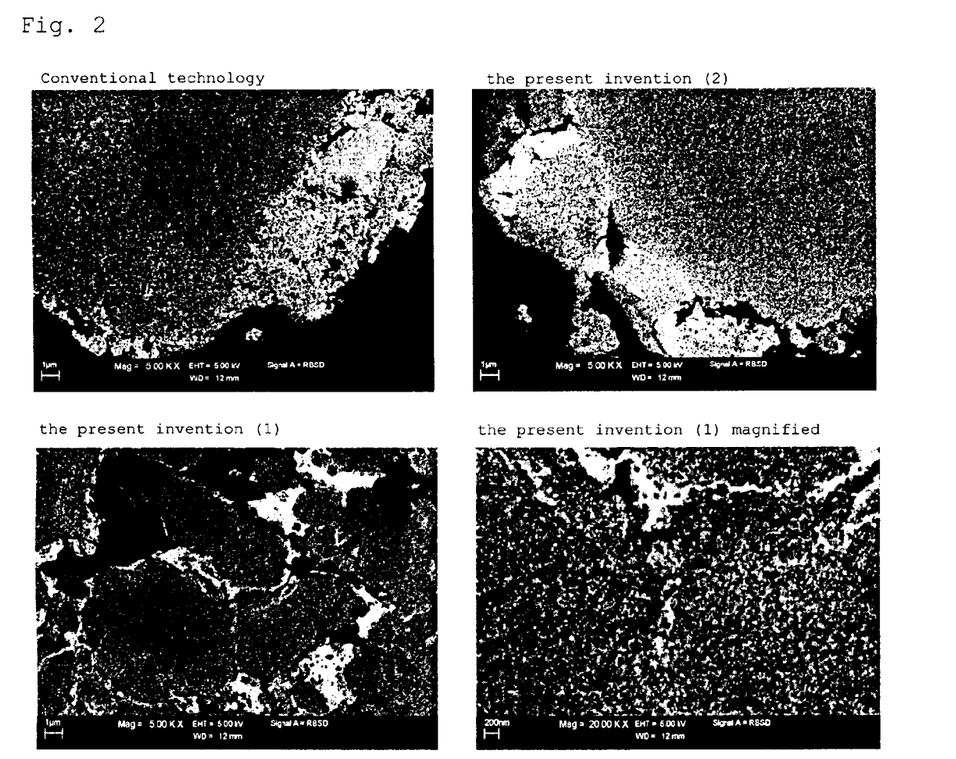
FIG. 2 is a photograph of the cross-section of the denitration catalyst composition of the present invention by SEM analysis, as compared with the cross-section of a conventional denitration catalyst composition.

FIG. 2 is a photograph of the cross-section of the denitration catalyst composition by SEM analysis, and in conventional technology, as shown at the upper left part of FIG. 2, the cerium-containing oxide (B) is present among the primary particles of the zirconium oxide-based carrier (A). On the contrary, in the present invention, as shown at the upper right part and the lower two photos of FIG. 2, the cerium-containing oxide (B) is present at the surface of the zirconium oxide-based carrier (A) and also at the gap of the secondary particles. It should be noted that the lower right part of FIG. 2 is a magnified one of a part of the lower left photo, and it is understood that the cerium-containing oxide (B) is penetrated into the gap of the secondary particles of the zirconium oxide-based carrier (A).

Figure 3:
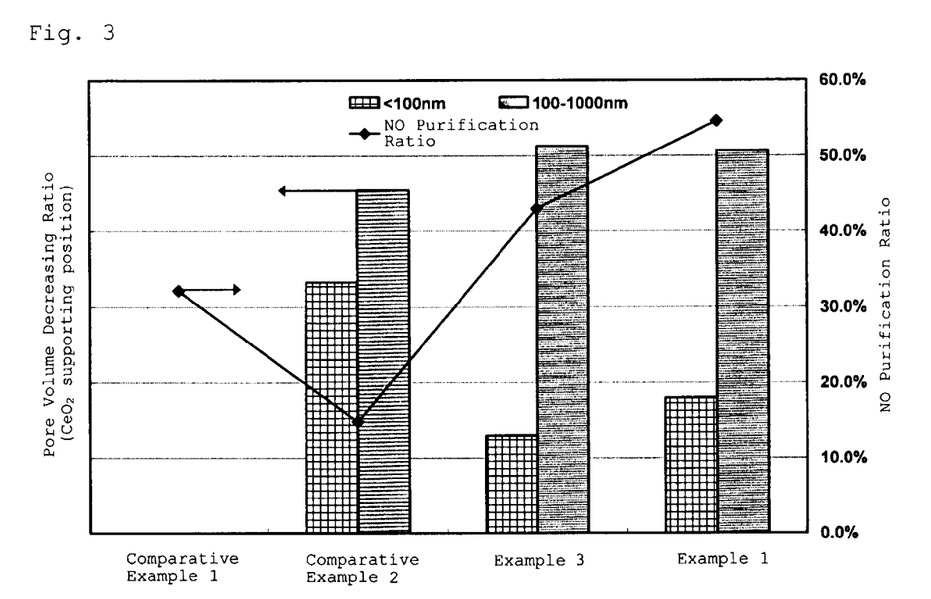
FIG. 3 is a graph of analysis result of a supporting position of $CeO_2$ by measurement of pore distribution and NO purification ratio of the denitration catalyst composition of the present invention.

In addition, in FIG. 3, analysis result of a supporting position of $CeO_2$ is shown by measurement of pore distribution and NO purification ratio of the denitration catalyst composition of the present invention, and from this result, it is understood that $CeO_2$ is difficult to be supported among the primary particles (less than 100 nm), and when it is present mainly among the secondary particles (100 to 1000 nm), high NO purification characteristics can be obtained. In the present invention, it is desirable that existence probability of $CeO_2$ among the secondary particles (100 to 1000 nm) is 50% or higher. The existence probability is preferably 60% or higher, more preferably 70% or higher and 80% or higher.

In the present catalyst reaction, it is important that $Rh/ZrO_2$ and $CeO_2$ have suitable distance space. It has been confirmed that when the distance space between $Rh/ZrO_2$ particles, which is a reaction field, and $CeO_2$ particles having oxygen diffusion control function, becomes far apart, for example, 20 μm, enhancement effect of NO purification performance by the addition of $CeO_2$ shows decreasing tendency.

Big characteristics of the present invention is to form a specific catalyst structure having a zirconium oxide phase and a cerium oxide phase, along with the interface thereof, while suppressing to make a solid solution of the zirconium oxide and the cerium oxide, after high temperature heat treatment in preparing the catalyst, and to bring about effective denitration action by means of this specific catalyst structure.

In addition, particle diameter of the cerium-containing oxide (B) is preferably set at 5 nm to 20 μm, and more preferably set at 10 nm to 2 μm. In this way, it is possible for the cerium-containing oxide (B) to be present at the surface the zirconium oxide-based carrier (A) and the gap of the secondary particles. The particle diameter of the cerium-containing oxide (B) below 5 nm makes the cerium-containing oxide (B) penetrated into pores (5 to 100 nm) among the primary particles of the zirconium oxide-based carrier (A), while the large particle diameter such as about 10 nm makes difficult presence into the pores among the primary particles of the zirconium oxide-based carrier (A), and it is estimated to be present selectively in the gap among the secondary particles.

It is desirable that the cerium-containing oxide (B) is mainly composed of a single phase of cerium oxide after heat treatment at 1000° C., and although it may be present in a form of a solid solution (mixed oxide) with the zirconium oxide, it is preferable that content of the single phase is 60% or higher, more preferably 70% or higher, and further preferably 80% or higher. The cerium-containing oxide (B), when it is mainly composed of a single phase of cerium oxide, enhances the effect to decrease oxygen concentration from $Rh/ZrO_2$. On the other hand, when a solid solution with the zirconium oxide increases and content of the single phase becomes less than 60%, denitration performance may sometimes decrease and is thus not preferable.

From a similar view point, solid solubility of the cerium-containing oxide (B) into the zirconium oxide-based carrier (A) is preferably 50% or lower, and more preferably 40% or lower.

It should be noted that the solid solubility of the cerium-containing oxide (B) into the zirconium oxide-based carrier (A) is specifically defined by the next equation (4).

$$\text{Solid solubility}(\%) = 100 \times (\text{concentration of } CeO_2 \text{ solid dissolved into } ZrO_2)/\{\text{total } CeO_2 \text{ concentration in}(ZrO_2+CeO_2)\} \quad (4)$$

Here, there is the following relation of expression (5) between concentration X of $CeO_2$ solid-dissolved into $ZrO_2$, and numerical value P of peak position of a practical sample. However, it is assumed that $CeO_2$ solid-dissolved into $ZrO_2$ is completely solid-dissolved.

$$X = 100 \times (49.550 - P)/(49.550 - 47.479) \quad (5)$$

It should be noted that, in the expression (5), 49.550 and 47.479 are numerical value of peak position of $ZrO_2$ and $CeO_2$ of the (220) plane of a diffraction pattern obtained by XRD measurement, respectively.

Therefore, in the present invention, solid solubility of the cerium-containing oxide (B) into the zirconium oxide-based carrier (A) is calculated from peak shift width of the practical sample from the peak position of the (220) plane of $ZrO_2$ and $CeO_2$ determined by XRD measurement, as standard.

Content of the cerium-containing oxide (B) is not especially limited, however, it is preferably 1 to 50% by weight, more preferably 1 to 30% by weight, still more preferably 1 to 20% by weight and most preferably 1 to 10% by weight, relative to the zirconium oxide-based carrier (A). The content within this rage can provide superior denitration performance.

The catalyst composition of the present invention can give expectation of desired denitration performance only by the above components, however, a composite oxide such as alumina, silica-alumina having high heat resistance, can be contained, as needed.

As the alumina, γ-alumina and α-alumina may be exemplified. The composite oxide includes an alumina-containing composite oxide such as silica-alumina-zirconia, silica-alumina-boria, in addition to silica-alumina.

2. The Production Method for the Denitration Catalyst Composition

The denitration catalyst composition of the present invention is not especially limited by production method therefor, and it can be produced, for example, by the following methods.

(1) Firstly, catalyst powder where the precious metal element (C) is supported on the zirconium oxide-based carrier (A) is prepared, by absorbing water and supporting an aqueous solution containing the precious metal element (C) having rhodium (Rh) as an essential component, onto raw material powder with an average particle diameter of 1 to 50 μm having a zirconium oxide as a main component, and then by calcining at 500° C. for 0.5 to 1 hour, as needed (hereafter it may be referred to as the first step).

Next, raw material powder of the cerium-containing oxide (B) with an average particle diameter of 0.1 to 20 μm is mixed, and crushing treatment is performed for particle size adjustment, as needed, to disperse and support the cerium-containing oxide (B) at the surface and the gap of the secondary particles of the zirconium oxide-based carrier (A), and after forming, as needed, it can be calcined at 500° C. for 0.5 to 1 hour under oxygen-containing atmosphere (hereafter it may be referred to as the second step).

(2) In addition, after preparing the catalyst powder where the precious metal element (C) was supported on the zirconium oxide-based carrier (A) in the above first step, instead of the above second step, raw material sol of the cerium-containing oxide with an average particle diameter of 5 to 20 μm is mixed under a pH of 2 to 9, to selectively disperse and support the cerium-containing oxide (B) at the surface of the zirconium oxide-based carrier (A) and the gap of the secondary particles, and after forming, as needed, it can be calcined at 500° C. for 0.5 to 1 hour under oxygen-containing atmosphere.

(3) Other than the above methods, after preparing the catalyst powder where the precious metal element (C) is supported on the zirconium oxide-based carrier (A) in the first step, and after impregnating ammonia water, instead of the above second step, an aqueous solution of the cerium-containing oxide is mixed to selectively disperse and support the cerium-containing oxide (B) at the surface of the zirconium oxide-based carrier (A) and the gap of the secondary particles, and after forming, as needed, it can be calcined at 500° C. for 0.5 to 1 hour under oxygen-containing atmosphere.

3. The Integral Structure-Type Denitration Catalyst

The denitration catalyst composition of the present invention can be used as a structural-type catalyst, where the above catalyst components are covered onto various carrier surfaces. Here, shape of the carrier is not especially limited, and is selectable from pillar-like, cylinder-like, spherical, honeycomb-like, sheet-like shape or the like, however, a honeycomb structured carrier is preferable. The size of the structure-type carrier is not especially limited, and the one having, for example, a diameter (length) of several mm to several cm can be used, as long as it is any of pillar-like, cylinder-like, and spherical shape.

The honeycomb structured carrier is the one made of ceramic such as cordierite, silicon carbide, silicon nitride, or a metal such as stainless steel, and is the one having many fine parallel gas flow paths extending over the whole structured carrier. As a material among them, cordierite is preferable in view of durability and cost.

In addition, hole number of the opening part of such a honeycomb structured carrier is further determined suitably in consideration of kind of exhaust gas to be treated, gas flow amount, pressure loss, removal efficiency or the like. Cell density thereof is preferably 100 to 900 cells/inch$^2$, and more preferably 200 to 600 cells/inch$^2$. The cell density over 900 cells/inch$^2$ tends to generate plugging caused by particulate materials (PM) adhered, while the cell density below 100 cells/inch$^2$ decreases geometrical surface area, resulting in decrease in effective utilization rate of a catalyst. It should be noted that the cell density means cell numbers per unit area in the cross-section in cutting the honeycomb structured carrier perpendicularly to the gas flow path.

In addition, as the honeycomb structured carrier, there has widely been known a flow-through-type structure having the connected gas flow paths, and a wall-flow-type structure where a part of the gas flow paths is sealed at the end face and gas is possible to flow through the wall face of the gas flow path. The flow-through-type structure has small air resistance and is possible to decrease pressure loss of exhaust gas, while the wall-flow-type structure is possible to filter off particulate components contained in exhaust gas. The denitration catalyst composition of the present invention can be used in both types of the structures.

The integral structure-type denitration catalyst of the present invention is produced by mixing the previous denitration catalyst composition and a binder or the like, as needed, with an aqueous medium to make a slurry-like mixture, and then coating it onto the integral structure-type carrier, followed by drying and calcining.

That is, firstly, the slurry-like mixture is obtained by mixing the denitration catalyst composition and the aqueous medium in predetermined ratio. In the present invention, the aqueous medium may be used in an amount where the denitration catalyst composition can disperse uniformly in the slurry.

In this case, an acid or an alkali can be blended for pH adjustment, as needed, and also a surfactant, a resin for dispersion purpose or the like can be blended for adjustment of viscosity or enhancement of slurry dispersion. As a mixing method of the slurry, a crushing mixing using a ball mill or the like is applicable, however, other crushing or mixing methods may be applied.

Next, the slurry-like mixture is coated onto the integral structure-type carrier. The coating method is not especially limited, however, a wash coat method is preferable.

The denitration catalyst composition of the present invention is preferably coated in a supporting amount of 50 to 350 g/L, and particularly desirably 80 to 250 g/L, relative to such a honeycomb structured carrier.

After coating, by performing drying and calcining, the integral structure-type denitration catalyst supported by the denitration catalyst is obtained. It should be noted that drying temperature is preferably 100 to 300° C., and more preferably 100 to 200° C. In addition, calcination temperature is preferably 300 to 700° C., and more preferably 400 to 600° C. Heating can be performed by a known heating means such as an electric furnace, a gas furnace.

4. The Denitration Method

The denitration method of the present invention is characterized in that exhaust gas containing NO (nitrogen oxides), CO (carbon monoxide) and $O_2$ (oxygen) is contacted with the previous denitration catalyst composition, under oxidative atmosphere having an air/fuel ratio (A/F) of 14.7 or higher, at a temperature range of 400 to 800° C.

In an automobile having a gasoline engine, flow rate of exhaust gas and temperature of exhaust gas differ depending on running condition, however, space velocity is roughly 40000 to 200000/hr, and temperature of exhaust gas is roughly 300 to 1000° C. Still more, in an automobile having a gasoline engine, air/fuel ratio (A/F) is always varying by ON/OFF of an accelerator or brake, shift change or the like, and there are a lean state, where fuel is insufficient, and a rich state, where fuel is excess, based on a stoichiometric air/fuel ratio of 14.7. The denitration method of the present invention can exert purification performance in such a space velocity region and temperature region, in particular, even in the lean state of the A/F of up to 20, where the NO purification reaction is difficult to proceed.

EXAMPLES

Examples and Comparative Examples of the present invention will be shown below, however, the present invention should not be construed to be limited to these Examples. It should be noted that a structure, a surface state or the like of a catalyst was analyzed by the following methods.

(1) XRD Measurement:

Diffraction patterns of powder samples obtained by Examples and Comparative Examples were measured using an X-ray diffraction measurement apparatus to identify catalyst components by comparing with an ICSD card data. The measurement was performed using a semiconductor detector under condition of 45 kV-40 mA, a step size of 0.0167 s and a scan speed of 0.107815°/s. Peak separation was performed from diffraction patterns obtained by a Gaussian function to determine peak positions and half-value widths.

Still more, solid solubility of $CeO_2$ with a $ZrO_2$ base material from the peak position of the $ZrO_2$ (220) plane, was calculated from peak shift width, in addition, crystalline diameter of $CeO_2$ was calculated from the half-value width using a Scherer expression.

(2) Particle Size Distribution Measurement of Material Powder:

Particle size distribution of powder was measured using a particle size distribution measurement apparatus of a UV semiconductor laser.

(3) SEM Measurement:

Powder samples of Examples and Comparative Examples were imbedded into a resin, and subjected to pretreatment for carbon shadowing to observe a catalyst structure using a scanning electron microscope. The measurement was performed using a backscattered electron detector (RBSD) under condition of an acceleration voltage of 5 kV, and an objective aperture of 60 µm. In addition, the particles were qualitatively analyzed using an energy-dispersion-type detector. Still more, the sizes of various kinds of catalyst components were measured using analysis software WinRoof.

(3) CO-MSA Measurement (Dispersion Degree Measurement of a Precious Metal):

1.0 g of each of various powder samples was subjected to reduction pre-treatment in $H_2$ at 400° C. for 10 minutes, and then CO adsorption amount was measured using a CO adsorption amount measurement apparatus by a CO pulse adsorption method, to calculate exposure area of the precious metal.

(5) Pore Distribution Measurement:

After drying 0.3 g of each of various powder samples, pore distribution of the catalyst sample was measured by a Hg intrusion measurement method. A supporting position of the added $CeO_2$ was estimated by decreasing ratio of pore volume, as compared with a sample not added with $CeO_2$.

Example 1

Firstly, composite oxide powder, having a BET of 40 to 70 $m^2/g$ and an average pore diameter of 10 to 50 nm, and composed of 10% of $Nd_2O_3$, 10% of $La_2O_3$ and 80% of $ZrO_2$, was prepared as a carrier.

Next, 9.45 g of this carrier was impregnated and supported in an aqueous solution, which was formed by diluting 0.68 g of 7.35% by weight rhodium nitrate aqueous solution (equivalent to 0.05 g of rhodium) with 2.0 g of water. This water-containing powder was subsequently impregnated and supported in 3.29 g (equivalent to 0.50 g of $CeO_2$) of a $CeO_2$ sol aqueous solution having a PH of 2 to 3, a sol diameter of 5 to 30 nm, a $CeO_2$ concentration of 15% and plus $\zeta$ potential, and after aging over night, it was calcined at 500° C. for 1 hour. 4.0 g of the powder catalyst after calcination was charged into an alumina crucible to perform heat treatment in an electric furnace in air at 1000° C. for 6 hours.

Compositions of the denitration catalyst compositions of the present invention are shown in Table 1, in addition, a photograph of the cross-section of the denitration catalyst composition analyzed with SEM is shown at the lower part of FIG. 2.

Figure 4:
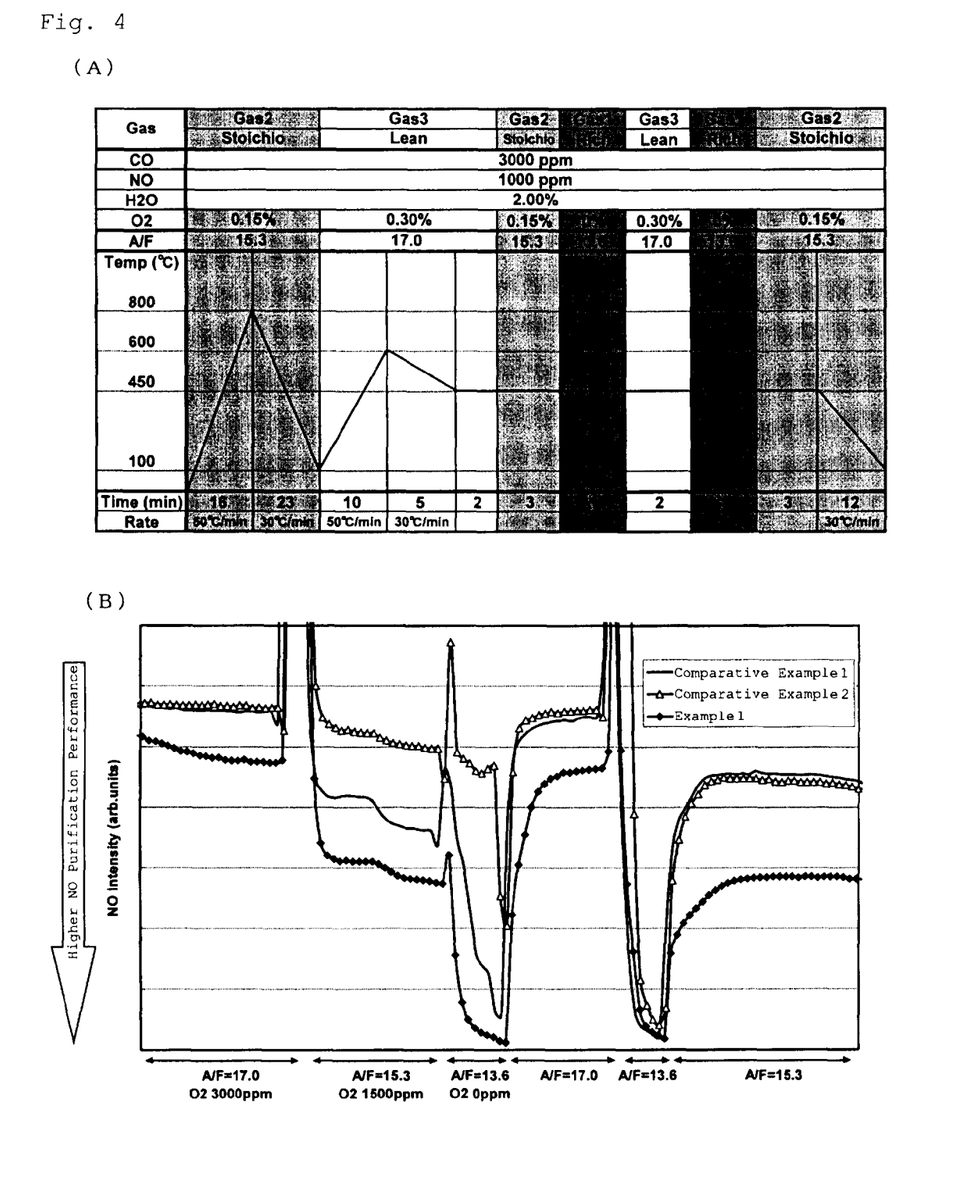
FIG. 4 is condition (A) in evaluation of denitration performance under atmosphere where oxygen concentration varies, using the denitration catalyst composition of the present invention, and a chart (B) showing the evaluation result.

Next, 50 mg of this catalyst after durability treatment was crushed in an agate mortar, and charged in a quartz sample holder to perform a catalyst performance test using a temperature programmed desorption gas analysis apparatus (TPD). Gas composition and temperature profile, under gas flow rate set at 300 cc/minute, were performed as shown in FIG. 4. From this result, it has been confirmed that the denitration catalyst composition of the present invention exerts superior denitration performance from the vicinity of stoichiometric atmosphere to lean (A/F of 13.6 to 17) atmosphere of excess oxygen.

Example 2

Instead of the sol solution of Example 1, 4.27 g (equivalent to 0.50 g of $CeO_2$) of a $CeO_2$ sol aqueous solution having a PH of 7 to 9, a sol diameter of 10 to 30 nm, a $CeO_2$ concentration of 12% and minus $\zeta$ potential, was used. Composition of the denitration catalyst composition of the present invention is shown in Table 1.

Next, the catalyst performance test was performed similarly as in Example 1. From this result, it has been confirmed that the denitration catalyst composition of the present invention exerts superior denitration performance from the vicinity of stoichiometric atmosphere to lean (A/F of 13.6 to 17) atmosphere of excess oxygen, as shown in FIG. 4.

Example 3

Similarly as in Example 1, $ZrO_2$ powder in which the aqueous solution of rhodium nitrate was impregnated, was impregnated into 2.0 g of 28% ammonia water and subsequently furthermore, was impregnated and supported into 1.71 g of 29.20% cerium nitrate aqueous solution (equivalent to 0.5 g of $CeO_2$). After that, similar aging and calcining treatment were performed. Composition of the denitration catalyst composition of the present invention is shown in Table 1, as well as, a photograph of the cross-section of this denitration catalyst composition analyzed with SEM is shown in FIG. 2 (at the upper right side).

Next, the catalyst performance test was performed similarly as in Example 1. From this result, it has been confirmed that the denitration catalyst composition of the present invention exerts superior denitration performance from the vicinity of stoichiometric atmosphere to lean (A/F of 13.6 to 17) atmosphere of excess oxygen, as shown in FIG. 4.

Example 4

Similarly as in Example 1, $ZrO_2$ powder impregnated with an aqueous solution of rhodium nitrate was calcined to prepare Rh-supported $ZrO_2$ powder. This Rh/$ZrO_2$ powder, the $CeO_2$ powder material having a BET of 150 to 200 $m^2/g$ and water were mixed in a ratio of 95:5:400 (a solid content of 20% by weight) to perform milling for 1 hour to prepare slurry so that 50% particle size became 2.0 μm. 100 g of the relevant slurry was charged into an evaporating dish to perform evaporating to dryness by stirring it on a hot plate heated at 150° C. for 30 minutes, still more drying overnight in a drying machine at 80° C., and calcined at 500° C. for 1 hour. Composition of the denitration catalyst composition of the present invention is shown in Table 1.

Next, the catalyst performance test was performed similarly as in Example 1. From this result, it has been confirmed that the denitration catalyst composition of the present invention exerts superior denitration performance from the vicinity of stoichiometric atmosphere to lean (A/F of 13.6 to 17) atmosphere of excess oxygen, as shown in FIG. 4.

Example 5

The denitration catalyst composition of the present invention shown in Table 1 was prepared similarly, except by crushing and mixing the Rh/$ZrO_2$ powder and the $CeO_2$ powder of Example 4, in a similar ratio, using an agate mortar so as to obtain a 50% particle size of 2.0 μm.

Next, the catalyst performance test was performed similarly as in Example 1. This denitration catalyst composition, as shown in FIG. 4, has a little lower denitration performance under lean (A/F of 15.3 to 17) atmosphere of excess oxygen, as compared with Example 1, however, there is no problem in practical use.

Comparative Example 1

The denitration catalyst composition for comparison shown in Table 1 was prepared similarly, except that $ZrO_2$ powder in which rhodium nitrate was impregnated, was calcined without adding the $CeO_2$ sol aqueous solution used in Example 1. In addition, a photograph of the cross-section of this denitration catalyst composition analyzed with SEM is shown in FIG. 2 (at the upper left side).

Next, the catalyst performance test was performed similarly as in Example 1. It has been confirmed that this denitration catalyst composition, as shown in FIG. 4, has lower denitration performance, as compared with Example 1, from the vicinity of stoichiometric atmosphere to lean (A/F of 13.6 to 17) atmosphere of excess oxygen.

Comparative Example 2

The denitration catalyst composition for comparison shown in Table 1 was prepared similarly, except that 1.71 g of the 29.2% cerium nitrate aqueous solution was used instead of the $CeO_2$ sol aqueous solution used in Example 1.

Next, the catalyst performance test was performed similarly as in Example 1. It has been confirmed that this denitration catalyst composition, as shown in FIG. 4, has lower denitration performance, as compared with Example 1, from the vicinity of stoichiometric atmosphere to lean (A/F of 13.6 to 17) atmosphere of excess oxygen.

Comparative Example 3

The denitration catalyst composition for comparison shown in Table 1 was prepared similarly, except that, by reverting the addition order of the ammonia water and the cerium nitrate aqueous solution in Example 3, the cerium nitrate and the ammonia water was added in this order to $ZrO_2$ powder in which rhodium nitrate was impregnated.

Next, the catalyst performance test was performed similarly as in Example 1. It has been confirmed that this denitration catalyst composition, as shown in FIG. 4, has lower denitration performance, as compared with Example 1, under lean (A/F of 15.3 to 17) atmosphere of excess oxygen.

Comparative Example 4

The denitration catalyst composition for comparison shown in Table 1 was prepared similarly, except that Rh/$ZrO_2$ powder and the $CeO_2$ powder of Example 4 were crushed and mixed in the similar ratio, using a beads mill, so that 50% particle size became 0.2 μm.

Next, the catalyst performance test was performed similarly as in Example 1. It has been confirmed that this denitration catalyst composition, as shown in FIG. 4, has lower denitration performance, as compared with Example 1, under lean (A/F of 15.3 to 17) atmosphere of excess oxygen.

Comparative Example 5

Composite oxide powder carrier, having a BET of 40 to 70 $m^2/g$ and an average pore diameter of 10 to 50 nm, and composed of 10% of $Ce_2O_2$, 5.0% of $Nd_2O_3$, 5.0% of $Y_2O_3$ and 80% of $ZrO_2$ was impregnated and supported into an aqueous solution of rhodium nitrate, and then it was subjected to similar conditioning and calcining treatment. In this way, the denitration catalyst composition for comparison shown in Table 1 was prepared.

Next, the catalyst performance test was performed similarly as in Example 1. It has been confirmed that this denitration catalyst composition, as shown in FIG. 4, has lower denitration performance as compared with Example 1, under lean (A/F of 15.3 to 17) atmosphere of excess oxygen.

TABLE 1

| | $CeO_2$ phase | Solid solubility | $CeO_2$ crystalline diameter (nm) | purification ratio of NO |
|---|---|---|---|---|
| Example 1 | $CeO_2$ | 34.7% | 9.2 | 54.6% |
| Example 2 | $CeO_2$ | 32.1% | 11.0 | 49.5% |
| Example 3 | $CeO_2$ | 37.9% | 8.8 | 43.0% |
| Example 4 | $CeO_2$ | 32.0% | 40.8 | 46.2% |
| Example 5 | $CeO_2$ | 16.5% | 32.4 | 37.9% |
| Comparative Example 1 | — | — | — | 32.2% |
| Comparative Example 2 | Solid-dissolve with $ZrO_2$ base material | 77.7% | N.D. | 14.8% |
| Comparative Example 3 | Solid-dissolve with $ZrO_2$ base material | 83.8% | N.D. | 29.6% |
| Comparative Example 4 | Solid-dissolve with $ZrO_2$ base material | 64.0% | N.D. | 30.7% |

TABLE 1-continued

|  | CeO$_2$ phase | Solid solubility | CeO$_2$ crystalline diameter (nm) | purification ratio of NO |
|---|---|---|---|---|
| Comparative Example 5 | Solid-dissolve with ZrO$_2$ base material | 100.0% | N.D. | 24.2% |

[Evaluation]

As described above, it is clear that the catalysts of Examples have higher NO purification rate and enhances selectivity of the CO—NO reaction, as compared with Comparative Examples. It should be noted that NO purification performance largely depended on a CeO$_2$ state after heat treatment at 1000° C. It is considered that solid solubility into a ZrO$_2$ base material of added CeO$_2$ during the heat treatment at 1000° C., is low (40% or lower), and oxygen concentration around an activated point can be decreased by a catalyst structure maintaining both the CeO$_2$ phase and the ZrO$_2$ phase, thus showing high CO—NO reactivity. On the other hand, in the case of high solid solubility of CeO$_2$ into a ZrO$_2$ base material, it is considered that because oxygen diffusion property around an activated point of Rh/ZrO$_2$ is enhanced, the CO—O$_2$ reaction proceeds predominantly and the NO purification reactivity was decreased.

In addition, it has been suggested that, even in the case where added CeO$_2$ does not make a solid solution, because of decreasing tendency of NO purification enhancement effect by the addition of CeO$_2$, when distance space between the Rh/ZrO$_2$ particle, which is a reaction field, and the CeO$_2$ particle having oxygen diffusion property control function, becomes far apart (20 μm) as in Example 5, suitable distance space between Rh/ZrO$_2$ and CeO$_2$ is an important factor in the present catalyst reaction.

INDUSTRIAL APPLICABILITY

The denitration catalyst composition of the present invention can be applied preferably to a denitration apparatus of nitrogen oxides in exhaust gas from a gasoline-type automobile and diesel-type automobile, however, it is also applicable widely in denitration technology of the nitrogen oxides in exhaust gas, such as a stationary exhaust source, for example, a boiler or the like.

The invention claimed is:

1. A denitration catalyst composition, comprising:
   a zirconium oxide-based carrier (A) formed by condensing or mixing the primary particles having a zirconium oxide as a main component;
   a cerium-containing oxide (B) being present at the surface of the zirconium oxide-based carrier (A) and at the gap of the secondary particles; and
   a precious metal element (C) having a rhodium (Rh) as an essential component, the precious metal element (C) being supported on the zirconium oxide-based carrier (A),
   wherein a pore of the zirconium oxide-based carrier (A) is composed of a pore formed by the primary particle of 5 to 100 nm, and a pore formed by the secondary particle of 0.2 to 10 μm.

2. The denitration catalyst composition according to claim 1, wherein the zirconium oxide-based carrier (A) contains one or more rare earth element and a transition metal element selected from the group consisting of La, Nd, Pr, Fe and Y, in an amount of 1 to 30% by weight, as an oxide.

3. The denitration catalyst composition according to claim 1, wherein particle diameter of the cerium-containing oxide (B) is 0.01 to 20 μm.

4. The denitration catalyst composition according to claim 1, wherein crystallite diameter of the cerium-containing oxide (B) is 8 to 50 μm.

5. The denitration catalyst composition according to claim 1, wherein the cerium-containing oxide (B) is a single phase of a cerium oxide or contains one or more kinds of a rare earth element and a transition metal element selected from La, Nd, Pr, Fe and Y, in an amount of 0 to 50% by weight, as an oxide.

6. The denitration catalyst composition according to claim 1, wherein solid solubility of the cerium-containing oxide (B) into the zirconium oxide-based carrier (A) is 50% or lower.

7. The denitration catalyst composition according to claim 1, wherein content of the cerium-containing oxide (B) is 1 to 50% by weight, relative to the zirconium oxide-based carrier (A).

8. The denitration catalyst composition according to claim 1, wherein the precious metal element (C) has a particle diameter of 1 to 5 nm.

9. The denitration catalyst composition according to claim 1, wherein the content of the precious metal element (C) is 0.01 to 10% by weight, relative to the zirconium oxide-based carrier (A).

10. A denitration method comprising: contacting exhaust gas containing NO (nitrogen oxides), CO (carbon monoxide) and O$_2$ (oxygen) with the denitration catalyst composition according to any one of claims 1-2 and 3-9, under oxidative atmosphere having an air/fuel ratio (A/F) of 14.7 or higher, at a temperature range of 400 to 800° C.

11. A denitration catalyst composition, comprising:
    a zirconium oxide-based carrier (A) formed by condensing or mixing the primary particles having a zirconium oxide as a main component;
    a cerium-containing oxide (B) being present at the surface of the zirconium oxide-based carrier (A) and at the gap of the secondary particles; and
    a precious metal element (C) having a rhodium (Rh) as an essential component, the precious metal element (C) being supported on the zirconium oxide-based carrier (A),
    wherein the precious metal element (C) has a particle diameter of 1 to 5 nm.

* * * * *